(12) United States Patent
Harrison et al.

(10) Patent No.: US 7,979,486 B2
(45) Date of Patent: *Jul. 12, 2011

(54) METHODS AND APPARATUS FOR EXTRACTING INTEGER REMAINDERS

(75) Inventors: John R. Harrison, Beaverton, OR (US); Ping T. Tang, Hayward, CA (US)

(73) Assignee: Intel Corporation, Santa Clara, CA (US)

( * ) Notice: Subject to any disclaimer, the term of this patent is extended or adjusted under 35 U.S.C. 154(b) by 876 days.

This patent is subject to a terminal disclaimer.

(21) Appl. No.: 11/946,593

(22) Filed: Nov. 28, 2007

(65) Prior Publication Data

US 2008/0071850 A1 Mar. 20, 2008

Related U.S. Application Data

(63) Continuation of application No. 10/628,811, filed on Jul. 28, 2003, now Pat. No. 7,321,916.

(51) Int. Cl.
    *G06F 7/535* (2006.01)
(52) U.S. Cl. .................................................. 708/654
(58) Field of Classification Search .................. None
    See application file for complete search history.

(56) References Cited

U.S. PATENT DOCUMENTS

| | | | |
|---|---|---|---|
| 5,644,639 | A | 7/1997 | Naciri et al. |
| 5,828,591 | A | 10/1998 | Rotstain |
| 5,900,023 | A | 5/1999 | Pase |
| 6,907,442 | B2 | 6/2005 | Ike |

FOREIGN PATENT DOCUMENTS

WO  03007147  1/2003

OTHER PUBLICATIONS

"PCT International Search Report," issued by the European Patent Office on Apr. 5, 2005, in connection with international application No. PCT/US2004/022351 (4 pages).

"PCT Written Opinion of the International Searching Authority," issued by the European Patent Office on Apr. 5, 2005, in connection with international application No. PCT/US2004/022351 (4 pages).

Granlund et al., "Division by Invariant Integers using Multiplication," published by ACM, New York, New York in Jun. 1994 (12 pages).

Harrison et al., "The Computation of Transcendental Functions on the IA-64 Architecture," Intel Technology Journal, vol. Q4, 1999 (7 pages).

(Continued)

*Primary Examiner* — David H Malzahn
(74) *Attorney, Agent, or Firm* — Hanley, Flight & Zimmerman, LLC (57) ABSTRACT

Methods and apparatus to determine a remainder value are disclosed. A disclosed example method involves, during a compilation phase, causing a processor to multiply a dividend value by a first value to generate a second value associated with a product. The first value is associated with a scaled approximate reciprocal of a divisor value, and the scaled approximate reciprocal of the divisor value is determined using a compound exponent value. During a runtime phase, the processor is caused to multiply a third value from the second value. The third value is generated using at least a subset bitfield of the second value. During the runtime phase, the processor is caused to determine a remainder value based on the third value. The processor is caused to store the remainder value in a memory.

36 Claims, 8 Drawing Sheets

OTHER PUBLICATIONS

Payne et al., "Degree Reduction for Trigonometric Functions," published by ACM, New York, New York in Apr. 1983 (2 pages).

Payne et al., "Radian Reduction for Trigonometric Functions," published by ACM, New York, New York in Jan. 1983 (6 pages).

"European Examination Report," issued by the European Patent Office on Aug. 7, 2006, in connection with European application No. 04 778 058.0-1243 (5 pages).

"European Examination Report," issued by the European Patent Office on Dec. 13, 2007, in connection with European application No. 04 778 058.0-2212 (4 pages).

"The First Office Action," issued by the State Intellectual Property Office of the People's Republic of China on Jul. 18, 2008, in connection with Chinese Patent Application No. 200480022467.0 (15 pages).

METHODS AND APPARATUS FOR EXTRACTING INTEGER REMAINDERS

RELATED APPLICATIONS

This patent is a continuation of U.S. patent application Ser. No. 10/628,811, filed on Jul. 28, 2003, now U.S. Pat. No. 7,321,916, and which is hereby incorporated herein by reference in its entirety.

FIELD OF THE DISCLOSURE

The present disclosure relates generally to processor systems and, more particularly, to methods and apparatus for extracting integer remainders within processor systems.

BACKGROUND

Many developments in connection with processor systems and, particularly, in connection with optimizing compilers, have been directed to increasing the speed or efficiency of processor computational operations. Faster or more efficient processor computational operations can result in faster program execution times, particularly if the fundamental procedures or computational operations that are the building blocks of an overall program can be made faster or more efficient. For example, the process of finding a quotient and remainder value associated with a division operation is a well-known fundamental procedure or computational operation.

In general, the process of performing a division operation and calculating a related remainder value is relatively more computationally intensive and expensive in terms of processor usage than more basic arithmetic operations such as addition and multiplication. However, many efficient techniques for calculating a quotient and a remainder are in widespread use. For example, for a divisor that is known at compile time and that is runtime invariant, it is possible to more efficiently or quickly calculate quotient values associated with runtime variant dividends using multiplication operations involving a value associated with a reciprocal of the runtime invariant divisor.

A processor system may determine a remainder value of interest by first performing a division operation. Often, a remainder value is of greater interest than a quotient. For example, when a processor system executes a modulus instruction, only a remainder value associated with a divisor value and a dividend value is returned.

One known technique for calculating a remainder is based on knowing the divisor value at compile time and that the divisor value is runtime invariant. Because the divisor value is known at compile time, a scaled approximate reciprocal of the divisor value can be calculated and pre-stored (i.e., prior to runtime), thereby enabling a processor system to calculate, during runtime, a quotient and remainder using a multiplication of the dividend and the scaled approximate reciprocal of the divisor value. In particular, a quotient may be calculated at runtime by augmenting the multiplication with a bit shift or bit extraction to compensate for the scaling of the reciprocal value. The remainder value can then be calculated by subtracting the product of the divisor and the quotient from the dividend.

Although the above-described quotient and remainder calculation technique is relatively efficient in many instances, it treats all combinations of dividend and divisor values in the same manner and does not consider more efficient solutions for specific dividend and divisor value combinations. Thus, traditional methods of computing quotient and remainder values within processor systems typically require the same amount of computational work or processor usage, regardless of whether a less computationally intensive technique may be employed.

DETAILED DESCRIPTION

Figure 1:
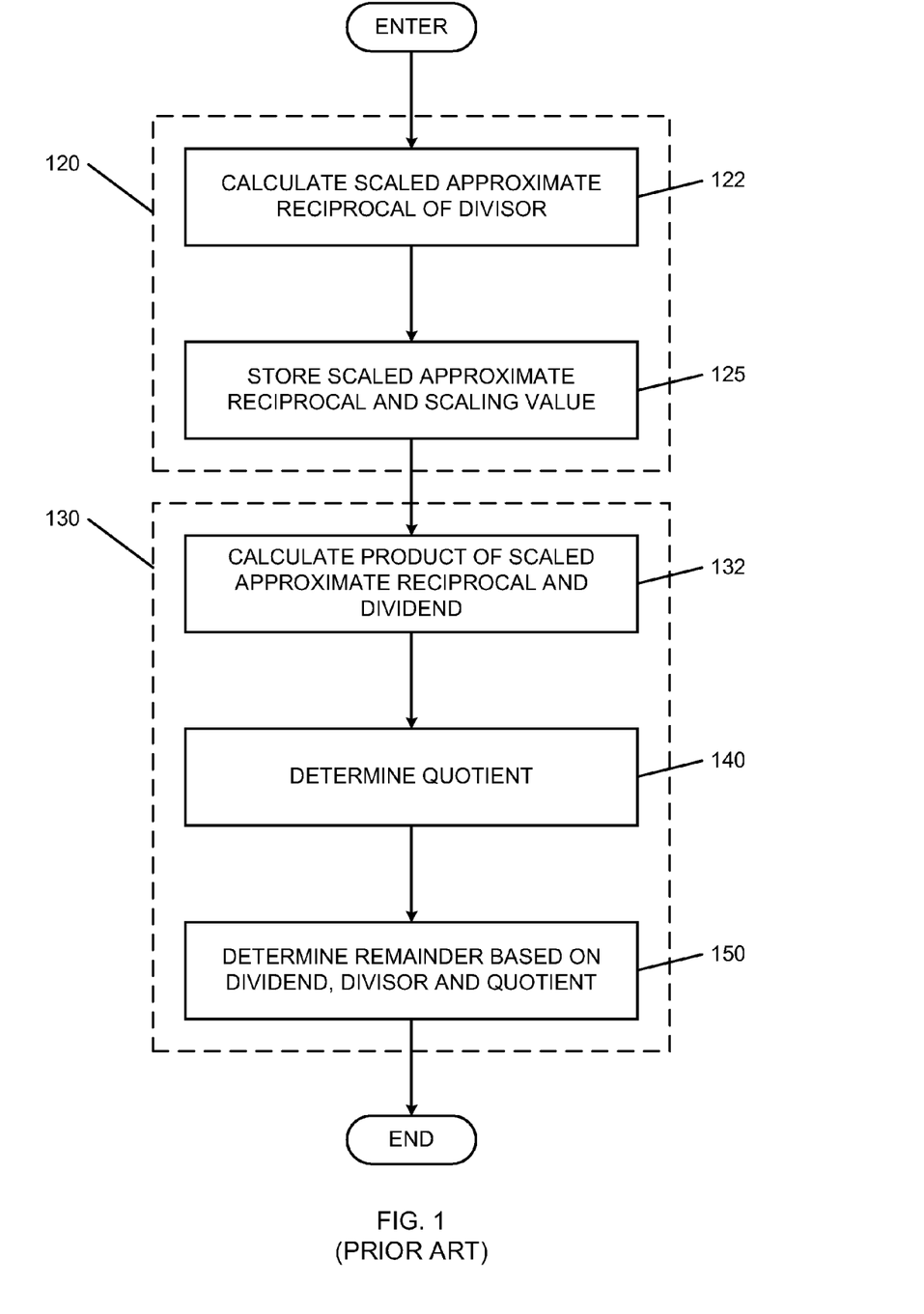
FIG. 1 is a flow diagram illustrating a known multiplication-based method for determining a quotient and remainder using a runtime invariant scaled approximate reciprocal of a divisor.

FIG. 1 is a flow diagram illustrating a known multiplication-based method for determining a quotient and remainder using a runtime invariant scaled approximate reciprocal of a divisor. As shown in FIG. 1, during a compilation phase (block 120) a scaled approximate reciprocal of a divisor is calculated (block 122) and stored in a memory (block 125) for subsequent use during a runtime phase (block 130). A scaled approximate reciprocal of a divisor may be calculated according to Equation 1 below.

$$w \approx \frac{2^p}{m} \quad \text{Equation 1}$$

In Equation 1 above, the value m is a divisor value determined at the compilation phase (block 120) and, thus, the value m is known in advance of runtime. The value p is a scaling value chosen so that the value w (i.e., the scaled approximate reciprocal) is an integer value. The divisor value m is invariant during the runtime phase (block 130) and, as a result, the scaled approximate reciprocal value w can be calculated once during the compilation phase (block 120) and used multiple times during the runtime phase (block 130) to calculate quotient and/or remainder values for runtime variant dividend values, as described in greater detail in connection with blocks 132 through 150 below.

During the runtime phase (block 130), the scaled approximate reciprocal value w can be used to calculate a product value q' for a runtime variant dividend value x (block 132) according to Equation 2 below.

$$q' = w \cdot x \quad \text{Equation 2}$$

The value x is associated with a dividend having a value that may vary during the runtime phase (block 130). The product value q', which represents a scaled approximate quotient value, is calculated during the runtime phase (block 130) by multiplying the scaled approximate reciprocal value w, which is a runtime invariant value, and the dividend value x, which may vary during the runtime phase (block 130).

The scaled approximate quotient value q' contains a quotient value that is associated with the scaling value p. In particular, a quotient value can be determined (block 140) during the runtime phase (block 130) using the scaled approximate quotient value q' and the scaling value p as described in Equation 3 below.

$$q = \left\lfloor q' \cdot \frac{1}{2^p} \right\rfloor \qquad \text{Equation 3}$$

As depicted in Equation 3 above, the quotient value q may be determined (block 140) by multiplying the scaled approximate quotient value q' by the inverse of two to the power of the value p. Alternatively, the quotient value q could be determined (block 140) by right bit-shifting the scaled approximate quotient value q' a number of times equal to the value p.

The quotient value q, the divisor value m and the dividend value x may be used during the runtime phase (block 130) to calculate the remainder value r (block 150) as shown in Equation 4 below.

$$r = x - m \cdot q \qquad \text{Equation 4}$$

As shown in Equation 4, the remainder value r may be determined (block 150) by subtracting the product of the divisor value m, which is runtime invariant, and the quotient value q from the runtime variant dividend value x.

Figure 2:
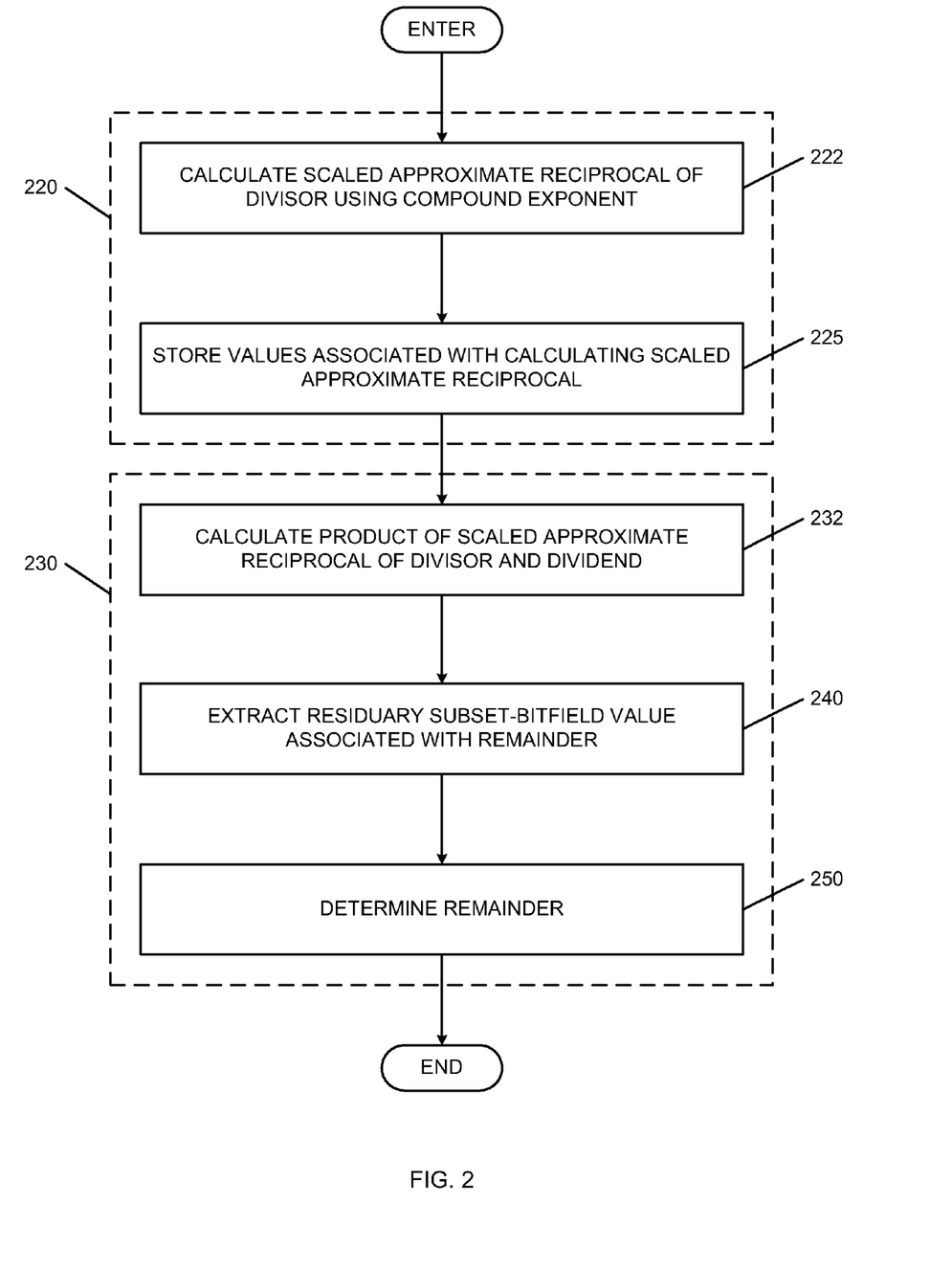
FIG. 2 is a flow diagram illustrating an example method for determining an integer remainder.

FIG. 2 is a flow diagram illustrating an example method for determining an integer remainder. The example method of FIG. 2 is valid for non-negative integer values. As shown in FIG. 2, during a compilation phase (block 220), a compensated scaled approximate reciprocal value $w_c$ of a divisor value m is calculated using a compound exponent (block 222) and is stored in a memory (block 225) for subsequent use during a runtime phase (block 230). The compensated scaled approximate reciprocal value $w_c$ of a divisor value m may be calculated as shown in Equation 5 below.

$$w_c \approx w' = \frac{2^{s+k}}{m} \qquad \text{Equation 5}$$

The value w' is a scaled reciprocal value of the runtime invariant divisor value m and is determined during the compilation phase (block 220). The sum of the values s and k is used as a compound exponent scaling value. In some implementations, this value may be selected so that $2^{k-1} < m < 2^k$ and so that s+k is less than or equal to the maximum possible bit length value during a runtime phase (i.e., s+k is less than or equal to a 32-bit value on a 32-bit processor system using 32-bit operations).

In another more specific implementation, when provided a fixed divisor value m and selecting a value of k as indicated above, a value of s may be determined based on instruction implementations. One such example involves an operation 'r=x modulo 3' for producing a positive integer and a maximized range for the dividend value x. Implementing this approach using a processor from the Intel® Itanium™ family may be carried out using a "pmpyshr" instruction that performs a 16-bit multiplication operation and a bit shift right operation. When using this instruction, the operation 'r=x modulo 3' results in a remainder value stored in the lower or least significant bit positions. This instruction is limited to bit shifting 0, 7, 15 and 16 bits, thus limiting the selection of a value of s to these numbers. In particular, for illustrative purposes, the values m and k may be selected to be m=3 and k=2. Subsequently, according to Equation 5 above and Equation 6 below, the selection of a value of s may determine a value of a compensation value a so that the overall range of the dividend value x is defined by $$x < \frac{2^s}{a}.$$

Thus, when using the values m=3 and k=2 and Equations 5 and 6 it is readily apparent that the range of the dividend value x is maximized to a value of 32,767 (i.e., $2^{15}$) when s is selected to be 15 or 16. Furthermore, because the "pmpyshr" instruction is capable of performing multiplications having no more than 16 bits, the value $w_c$, as shown in Equation 6 below, must be represented using a 16-bit value (i.e., ≦65,535 or ≦$2^{16}$). Therefore, in this instance, s=15 is the best choice. However, in still other implementations, the compound exponent scaling value may be selected in other manners to suit the particular implementation The scaled reciprocal value w', which may not be an integer value, is an intermediate value of the compensated scaled approximate reciprocal value $w_c$. During the compilation phase (block 220), calculating the compensated scaled approximate reciprocal value $w_c$ of the runtime invariant divisor value m (block 222) involves performing a round-up operation on the scaled reciprocal value w'. The round-up operation results in an approximation value of w', which is the compensated scaled approximate reciprocal value $w_c$ shown in Equation 5 above. In instances where the scaled reciprocal value w' is a non-integer value, the scaled reciprocal value w' is rounded up to the next nearest integer value to yield the compensated scaled approximate reciprocal value $w_c$. On the other hand, in instances where the scaled reciprocal w' is an integer value, it may be apparent that the runtime invariant divisor value m is a power of 2, therefore, a remainder value may be determined to equal a bitfield value such as, for example, the residuary subset bitfield value b as described in greater detail in connection with FIG. 3.

The round-up operation performed on the scaled reciprocal value w' results in a compensation value a, which may be associated with an error value or an approximation value. As shown below in Equation 6, the compensation value a may be determined using the values $w_c$, m and the compound exponent values s and k. The compensated scaled approximate reciprocal value $w_c$ may then be represented as shown in Equation 7.

$$a = w_c \cdot m - 2^{s+k} \quad \text{where } a > 0 \qquad \text{Equation 6}$$

$$w_c = \frac{2^{s+k} + a}{m} \qquad \text{Equation 7}$$

The divisor value m is runtime invariant and, thus, the compensated scaled approximate reciprocal value $w_c$ of the divisor value m and the compensation value a can be calculated once during the compilation phase (block 220). During the compilation phase (block 220), the values m, $w_c$, s, k and a can be stored in a memory (block 225) and may be used multiple times during the runtime phase (block 230) to calculate quotient and/or remainder values for runtime variant dividend values, as described in greater detail in connection with blocks 232 through 250 below.

During the runtime phase (block 230), a product value associated with a compensated scaled approximate quotient value u may be determined for a given dividend value x. The compensated scaled approximate quotient value u may be represented as a binary value and may be found via a multiplication operation as depicted in Equation 8 below.

$$u = w_c \cdot x \quad \text{Equation 8}$$

The multiplication of the compensated scaled approximate reciprocal value $w_c$ and the runtime variant dividend value x result in a compensated scaled approximate quotient value u (block 232).

The compensated scaled approximate quotient value u is associated with a compound exponent scaling value s+k. In addition, the compensated scaled approximate quotient value u includes a portion associated with a quotient q and a portion associated with a remainder r. More specifically, the compensated scaled approximate quotient value u is composed of a set of contiguous bits that includes a subset of contiguous bits that forms a residuary subset bitfield value b, which is associated with an intermediate remainder calculating value that may be used to determine the remainder value r. The subset of contiguous bits that forms the residuary subset bitfield value b is within a range of bit positions associated with the compound exponent scaling values s and k as set forth in Equation 9 below.

$$b = (w_c \cdot x)_{[s, s+k-1]} \quad \text{Equation 9}$$

During the runtime phase (block 230), the residuary subset bitfield value b is extracted from the compensated scaled approximate quotient value u (block 240). In particular, the subset of contiguous bits defined by the inclusive bit position boundary values s and s+k−1 is extracted from the compensated scaled approximate quotient value u. The extracted residuary subset bitfield value b may then be used during the runtime phase (block 230) to determine a remainder value (block 250) for a runtime invariant divisor value m and a runtime variant dividend value x.

Figure 3:
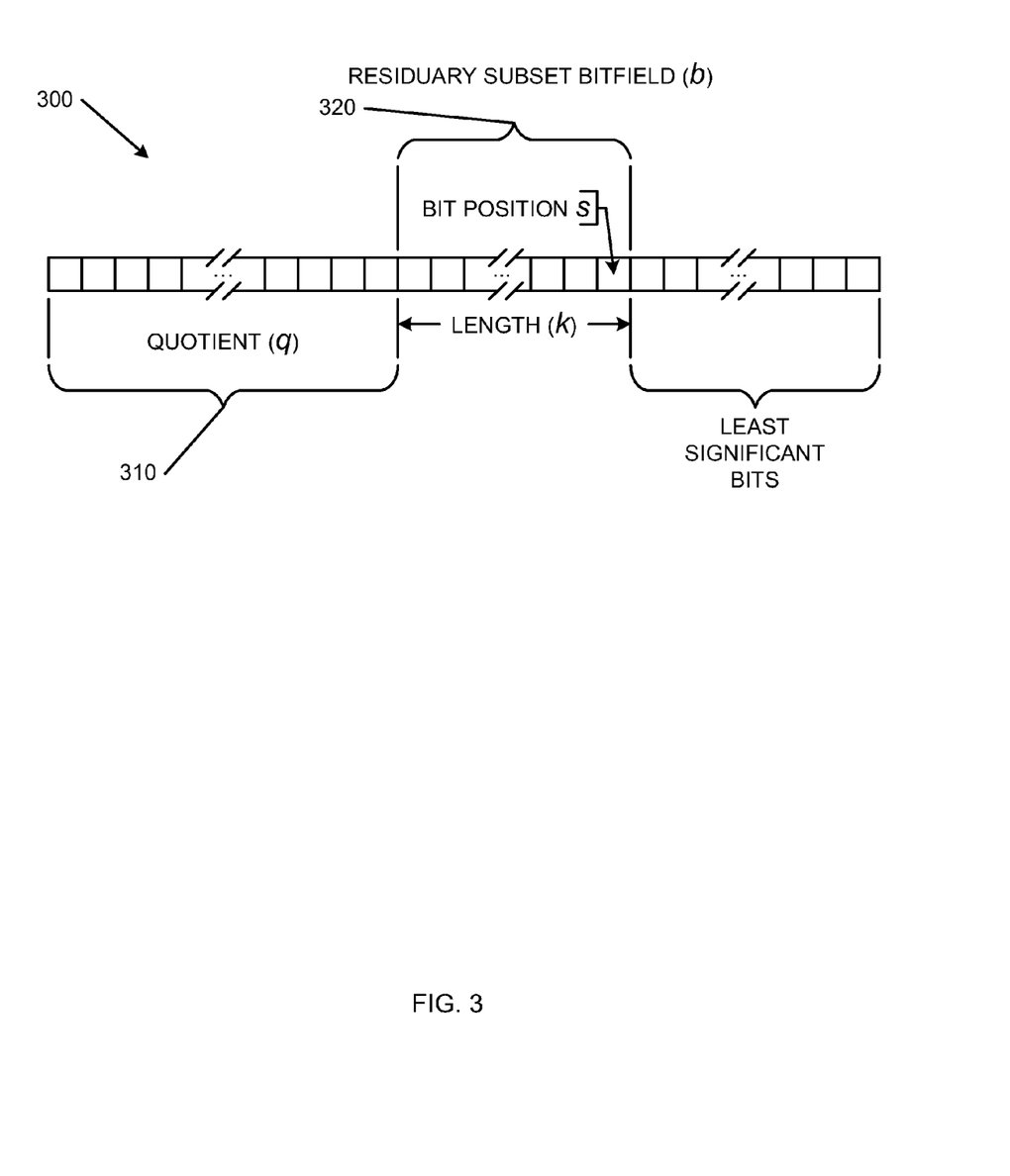
FIG. 3 depicts an example of a residuary subset bitfield that may be used with the example method of FIG. 2 to determine a remainder value.

FIG. 3 depicts an example of a binary value 300 that may be used with the example method of FIG. 2 to determine a remainder value. The set of contiguous bits that forms the binary value 300 may correspond to the compensated scaled approximate quotient value u and may be divided into at least two subsets of contiguous bits. A first subset of contiguous bits 310 is associated with a quotient value q and a second subset of contiguous bits 320 is associated with a residuary subset bitfield value b, which may be used to determine a remainder value r as described herein. The second subset of contiguous bits 320 that makes up the residuary subset bitfield value b is defined to start at an inclusive boundary bit position value s and has a bit length value k as set forth in Equation 9 above.

Figure 4:
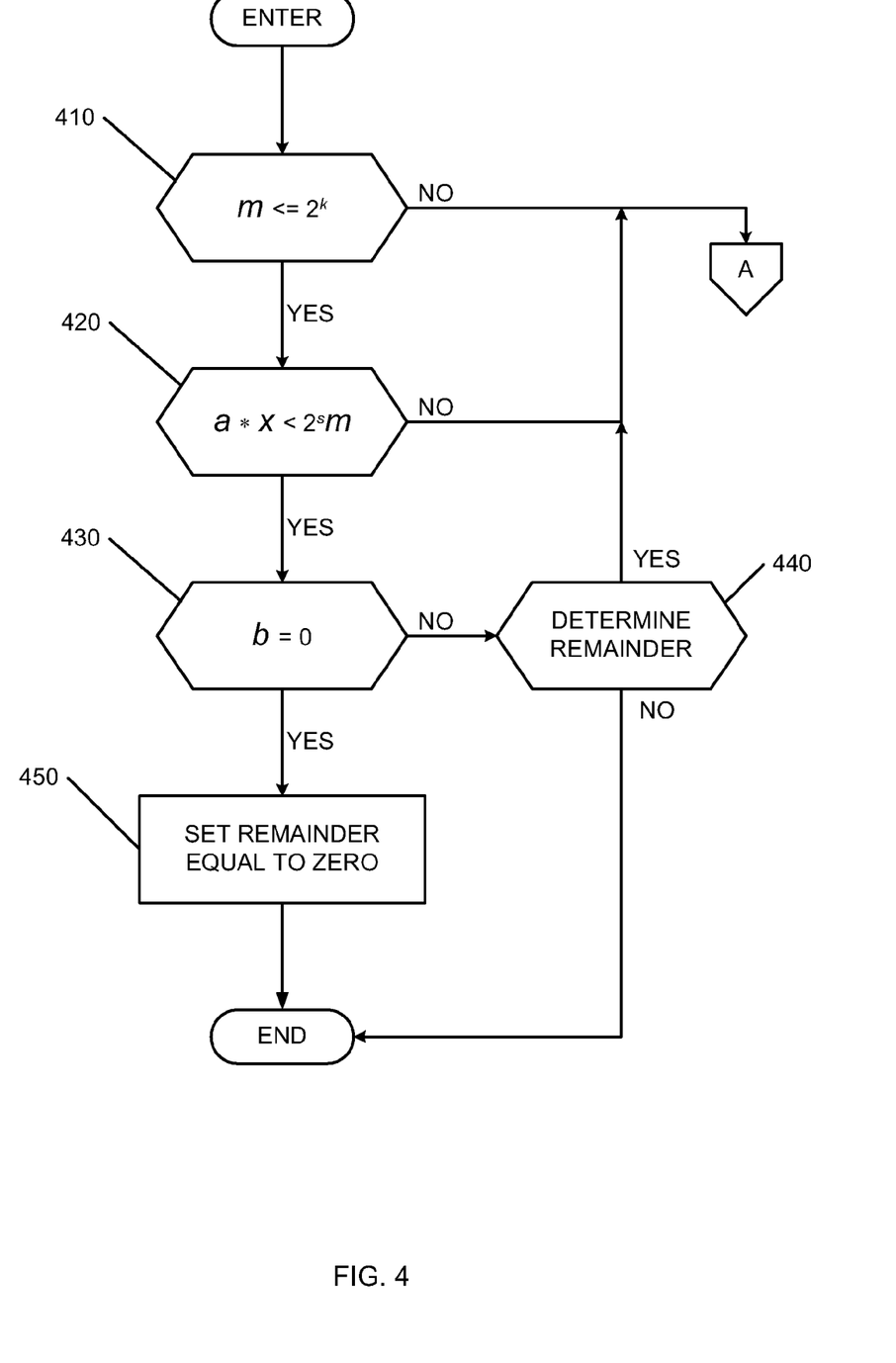
FIGS. 4-6 depict a more detailed flow diagram of example methods in which a remainder value may be determined using the method of FIG. 2.
Figure 5:
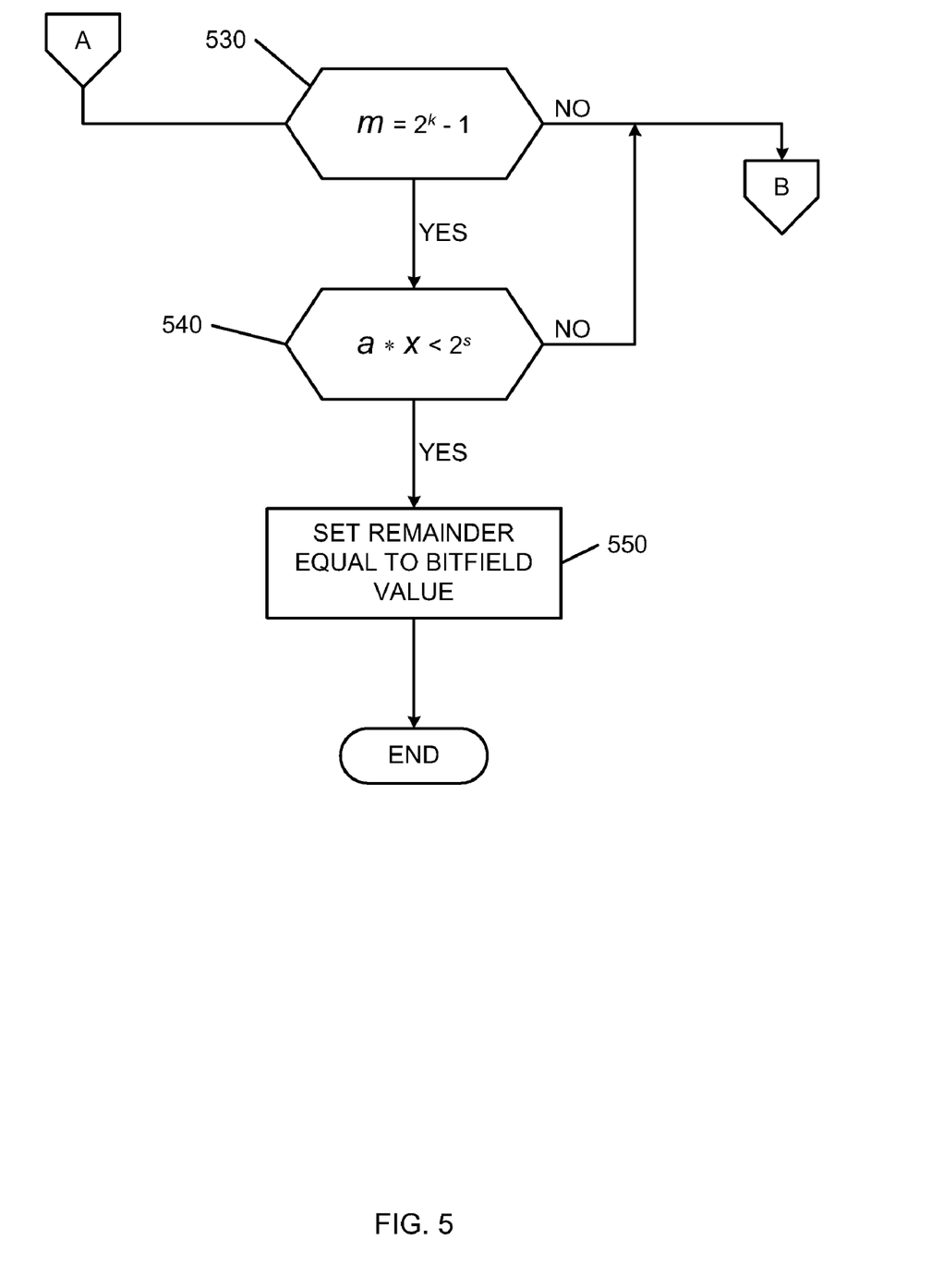
Figure 6:
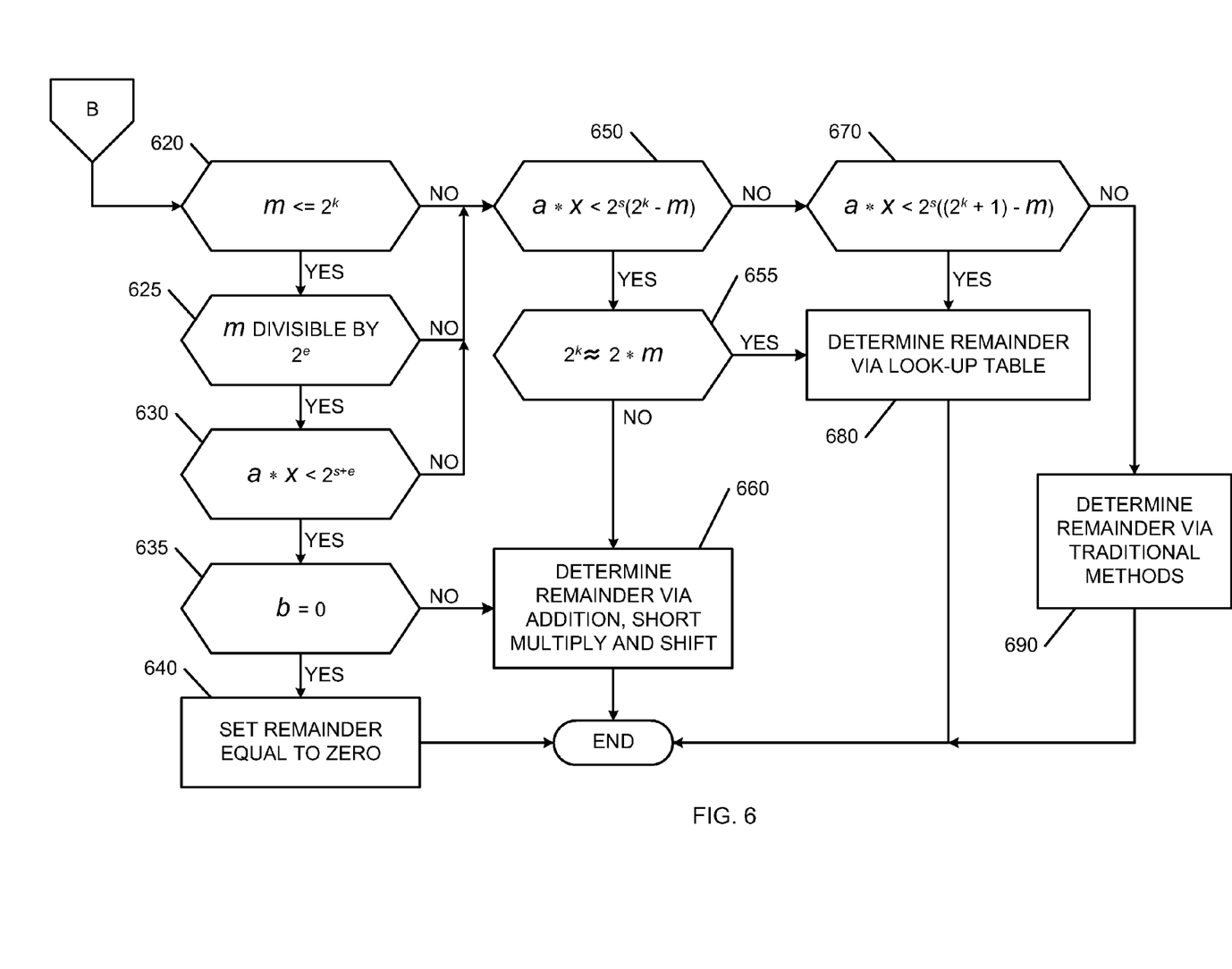

FIGS. 4-6 depict a more detailed flow diagram of example methods by which a remainder value may be determined using the method of FIG. 2. In general, the example methods shown in FIGS. 4-6 may enable a processor-based system to determine the remainder value r in different manners based on the divisor value m and the runtime values associated with the dividend x, the compensation value a, and the extracted residuary subset bitfield value b. More specifically, as described in greater detail in connection with FIGS. 4-6 below, the divisor value m, the compensation value a, and the residuary subset bitfield value b are compared to threshold values associated with the compound exponent values s and k. The remainder value r is then determined or calculated using at least a portion of the extracted residuary subset bitfield value b and based on the result of one or more of the comparisons. In this manner, a processor system (e.g., the processor system shown in FIG. 8) or a system based on an alternative architecture (e.g., the system shown in FIG. 7) may implement the methods as a plurality of test conditions or comparisons that are executed in a sequence that enable the remainder value r to be determined in an efficient manner.

Now turning to FIG. 4, a flow diagram illustrating an example method for determining if the existence of a non-zero remainder value is provided. In general, the example method of FIG. 4 uses one or more of three test conditions or comparisons to determine whether or not the remainder value r equals zero.

In particular, a first test condition compares the divisor value m to the value of two to the power of the residuary subset bitfield bit length value k (block 410). In instances where the value of the divisor value m is less than or equal to the value $2^k$, a second test condition compares the product of the compensation value a and the dividend value x to the value $2^s$ multiplied by the divisor value m (block 420). In cases where the product $a \cdot x$ is less than the product $2^s \cdot m$, a zero test of the residuary subset bitfield value b is performed (block 430). If the residuary subset bitfield value b is equal to zero at block 430, the remainder r is set equal to zero (block 450).

If any of the test conditions or comparisons carried out at blocks 410, 420 or 430 are not satisfied (e.g., $m > 2^k$, $a \cdot x \geq 2^s \cdot m$ or $b \neq 0$), the remainder value r is not set equal to zero and control is passed to block 440 where an evaluation is made whether to determine an exact remainder value r. In instances where an exact remainder value r is not relevant (block 440), then the process of FIG. 4 determines that the remainder value r is non-zero. On the other hand, in instances where the remainder value r is relevant (block 440), an exact remainder value r may need to be determined and control is passed to the example method shown in FIG. 5.

FIG. 5 is a flow diagram of an example method for determining a remainder value. More specifically, the example method of FIG. 5 determines whether the remainder value r is equal to the residuary subset bitfield value b. In general, the example method of FIG. 5 uses one or more of two test conditions or comparisons to determine whether or not the remainder value r is equal to the residuary subset bitfield value b.

In particular, the first test condition compares the divisor value m to the value $2^k - 1$ (block 530), where the value k is equal to the residuary subset bitfield length. In instances where the divisor value m is equal to $2^k - 1$, a second test condition compares the product of the compensation value a and the dividend value x to the value $2^s$ (block 540), where the value s is equal to the residuary subset bitfield inclusive boundary bit position. If the product $a \cdot x$ is less than the value $2^s$, the remainder value r is exactly equal to the residuary subset bitfield value b (block 550).

On the other hand, if either of the test conditions or comparisons carried out at blocks 530 or 540 is not satisfied (e.g., $m \neq 2^k - 1$ or $a \cdot x \geq 2^s$), the remainder value r is not set equal to the residuary bitfield value b and control is passed to the example methods shown in FIG. 6.

FIG. 6 is a flow diagram of three example methods for determining a remainder value. In general, each of the three example methods of FIG. 6 uses one or more test conditions or comparisons to determine the remainder value.

As shown in FIG. 6, the first example method for determining a remainder value uses one or more of four test conditions or comparisons to determine the remainder value. In particular, a first test condition compares the divisor value m to the value of two to the power of the residuary subset bitfield bit length value k (block 620). In instances where the value of the divisor value m is less than or equal to the value $2^k$, a second test condition determines if the divisor value m is divisible by two to the power of a value e (block 625), where e is chosen to be an integer value. In instances where the divisor value m is divisible by the value $2^e$, a third test compares the product of the compensation value a and the dividend value x to the value $2^{s+e}$ (block 630). For cases where the product a·x is less than the value $2^{s+e}$, the relationship of the residuary subset bitfield value b and the remainder value r may be represented by Equation 10 below. The brackets '$\lfloor \ldots \rfloor$' denote the 'floor' function, so that $\lfloor x \rfloor$ is a unique integer so that $\lfloor x \rfloor \leq x < \lfloor x \rfloor + 1$.

$$b = \left\lfloor \frac{2^k \cdot r}{m} \right\rfloor \qquad \text{Equation 10}$$

As depicted in Equation 10, the residuary subset bitfield value b is equal to the floor function of two to the power of the residuary subset bitfield bit length value k multiplied by the remainder value r and divided by the divisor value m.

Furthermore, for cases where the product a·x is less than the value $2^{s+e}$, a zero test of the residuary subset bitfield value b is performed (block 635). If the residuary subset bitfield value b is equal to zero at block 635, the remainder value r is set equal to zero (block 640). However, if the residuary subset bitfield value b is not equal to zero, the remainder value r may be determined via the combination of an addition operation, a short multiplication operation and a shift operation (block 660) according to Equation 11 below.

$$r = \left\lfloor \frac{m \cdot (b+1)}{2^k} \right\rfloor \qquad \text{Equation 11}$$

As shown in Equation 11, the remainder value r may be determined by the floor function of the divisor value m multiplied by the quantity of the residuary subset bitfield value b plus one and right bit-shifting the resulting product a number of times equal to the residuary subset bitfield length value k.

If any one of the test conditions or comparisons carried out at blocks 620, 625 or 630 is not satisfied (e.g., $m > 2^k$, m not divisible by $2^e$ or $a \cdot x \geq 2^{s+e}$), control is passed to the blocks of a second example method for determining a remainder value.

A second example method for determining a remainder value, as shown in FIG. 6, uses one or more of two test conditions or comparisons to determine the remainder value. In particular, a first test condition compares the product of a compensation value a and a dividend value x to the value $2^s(2^k - m)$ (block 650). In instances where the product a·x is less than the value $2^s(2^k - m)$, the size of the divisor value m may be analyzed to determine whether the remainder value r may be determined via a look-up table (block 655). A look-up table may be used for determining the remainder value r if the size of the divisor value m is deemed to be 'relatively small'. For instance, in a processor system having limited memory, the divisor value m equal to ten (i.e. m=10) may be 'relatively small' enough to implement since a look-up table would include at most sixteen entries and would require minimal memory. On the other hand, it may not be suitable to implement a look-up table on a processor system having limited memory if the divisor value m is not 'relatively small', thereby requiring a larger number of entries such as, for example, 1,048,576 entries (i.e. m=100,000). However, in instances where a processor system includes a large memory capable of handling large amounts of data such as, for example, large look-up tables, it may be possible to implement a look-up table for the example of the divisor value m equal to 100,000 to determine the remainder value r. In any case, if the divisor value m is deemed 'relatively small' in view of the processor system and available memory, the remainder value r may be determined via a look-up table retrieval technique (block 680). A look-up table retrieval technique may be implemented with multiple table entry reference locations associated with the residuary subset bitfield b. Furthermore, each look-up table entry may include a remainder value that is associated with a respective table entry reference location. However, if the divisor value m is deemed not 'relatively small' in view of the processor system and available memory, the remainder value r may be determined via a combination of an addition operation, a short multiplication operation and a right bit-shift operation (block 660) according to Equation 11 above. Furthermore, if the test condition comparison carried out by block 650 is not satisfied (i.e., $a \cdot x \geq 2^s(2^k - m)$), control is passed to the blocks of a third example method for determining a remainder value.

A third example method for determining a remainder value shown in FIG. 6 uses at least one test condition or comparison to determine the remainder value. In particular, a first test condition compares the product of a compensation value a and the dividend value x to the value $2^s((2^k+1) - m)$ (block 670). In instances where the product a·x is less than $2^s((2^k+1) - m)$, the relationship of the residuary subset bitfield value b and the remainder value r may be represented by Equation 12 below and the remainder value r may be determined via a look-up table retrieval technique (block 680).

$$\left\lfloor \frac{2^k \cdot r}{m} \right\rfloor \leq b < \left\lfloor \frac{2^k \cdot (r+1)}{m} \right\rfloor \qquad \text{Equation 12}$$

As depicted by Equation 12, the floor function of the remainder value r multiplied by the value $2^k$ and divided by the divisor value m is less than or equal to the residuary subset bitfield value b. Also, the residuary subset bitfield value b is less than the product of the remainder value r plus one and $2^k$ divided by the divisor value m.

If the test condition comparison carried out at block 670 is not satisfied (e.g., $a \cdot x \geq 2^s((2^k+1) - m)$), the remainder value r may be determined via traditional methods for determining a remainder (block 690). For example, one traditional method for determining the remainder value r involves recovering a quotient value q from a compensated scaled approximate quotient value u according to Equation 13 below. Using the quotient value q, the dividend value x and the divisor value m, the remainder value r may then be determined using a combination of a multiplication operation and a subtraction operation as shown in Equation 14 below.

$$q = u \cdot \frac{1}{s^{s+k}} \qquad \text{Equation 13}$$

$$r = x - m \cdot q \quad \text{where } 0 \leq r < m \qquad \text{Equation 14}$$

As depicted in Equation 13, the quotient value q is equal to the compensated scaled approximate quotient value u right bit-shifted a number of times equal to the compound exponent value s+k. Furthermore, as shown in Equation 14, the remainder value r is equal to the dividend value x minus the product of the divisor value m and the quotient value q.

Figure 7:
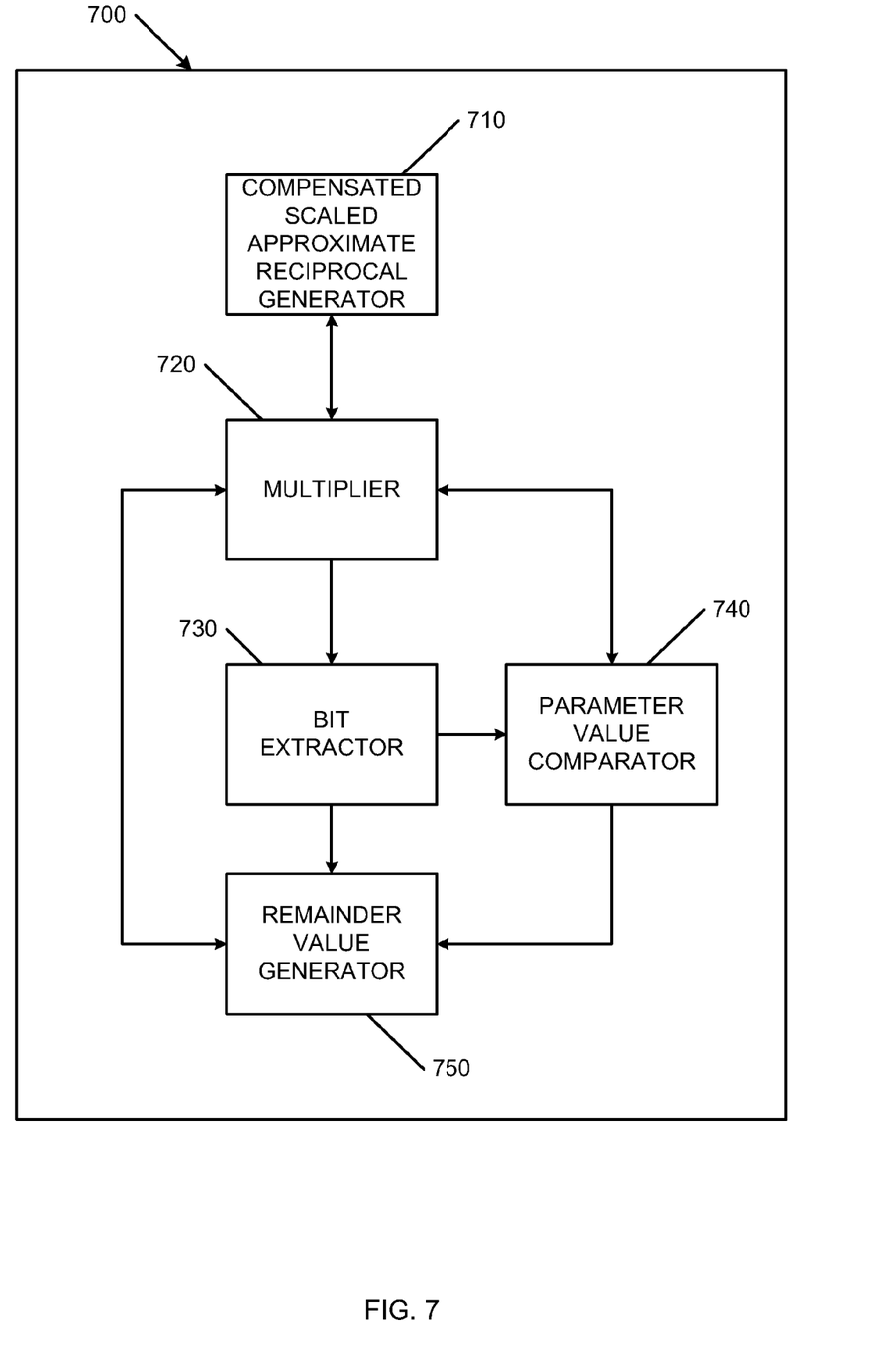
FIG. 7 is a block diagram of an example hardware architecture that may be configured to determine a remainder value using the methods of FIGS. 2 and 4-6.

FIG. 7 is a block diagram of an example hardware architecture 700 that may be configured to determine a remainder value using the methods of FIGS. 2 and 4-6. As shown in FIG. 7, the example hardware architecture 700 includes a compensated scaled approximate reciprocal generator 710, a multiplier 720, a bit extractor 730, a parameter value comparator 740 and a remainder value generator 750.

The example hardware architecture or system 700 shown in FIG. 7 may be configured to generate a compensated scaled approximate reciprocal value $w_c$ of a divisor value m and a dividend value x, a compensated scaled approximate quotient value u associated with quotient and remainder values of the divisor value m, and dividend value x in accordance with the methods depicted in FIGS. 2 and 4-6. More specifically, the example system 700 may implement these methods as a plurality of test conditions or comparisons that are executed in a sequence to determine the remainder value r in the most efficient manner.

The compensated scaled approximate reciprocal generator 710 enables the example system 700 to generate a compensated scaled approximate reciprocal $w_c$ of a divisor value m. The compensated scaled approximate reciprocal $w_c$ may be generated according to Equations 5, 6 and 7 as shown above using a divisor value m, a compensation value a and compound exponent values s and k, where s is equal to a residuary subset bitfield inclusive boundary bit position and k is equal to a residuary subset bitfield bit length.

The multiplier 720 enables the example system 700 to generate a compensated scaled approximate quotient value u, which is a product of the compensated scaled approximate reciprocal $w_c$ and a dividend value x according to Equation 8. The compensated scaled approximate quotient value u includes a quotient value of the divisor value m and the dividend value x. Furthermore, the compensated scaled approximate quotient value u includes a residuary subset bitfield value b that is associated with a remainder value r of the divisor value m and the dividend value x.

The bit extractor 730 enables the system architecture 700 to extract a residuary subset bitfield value b from the compensated scaled approximate quotient value u. The range of contiguous bits that forms the residuary subset bitfield value b is associated with the compound exponent values s and k according to Equation 9 above, where 1 is equal to a residuary subset bitfield inclusive boundary bit position and k is equal to a residuary subset bitfield bit length.

The parameter value comparator 740 enables the example system 700 to determine the most efficient method, based on the methods for determining a remainder value of FIGS. 4-6, by which to generate a remainder value. In particular, the parameter value comparator 740 determines the method by which to generate a remainder value r based on a divisor value m, a dividend value x, the compensation value a, and the residuary subset bitfield value b. More specifically, as described in greater detail in connection with FIGS. 4-6, the parameter value comparator (block 740) may compare values of the divisor value m, the compensation value a, and the residuary subset bitfield value b to values associated with the compound exponent values 1 and k. The remainder value r may then be generated using at least a portion of the residuary subset bitfield value b and based on the result of one or more of the comparisons.

The remainder value generator 750 enables the example system 700 to generate a remainder value r using the remainder generation method indicated by the parameter value comparator 740. Thus, the remainder value r may be generated in any one of the several manners depicted in FIGS. 4-6.

Figure 8:
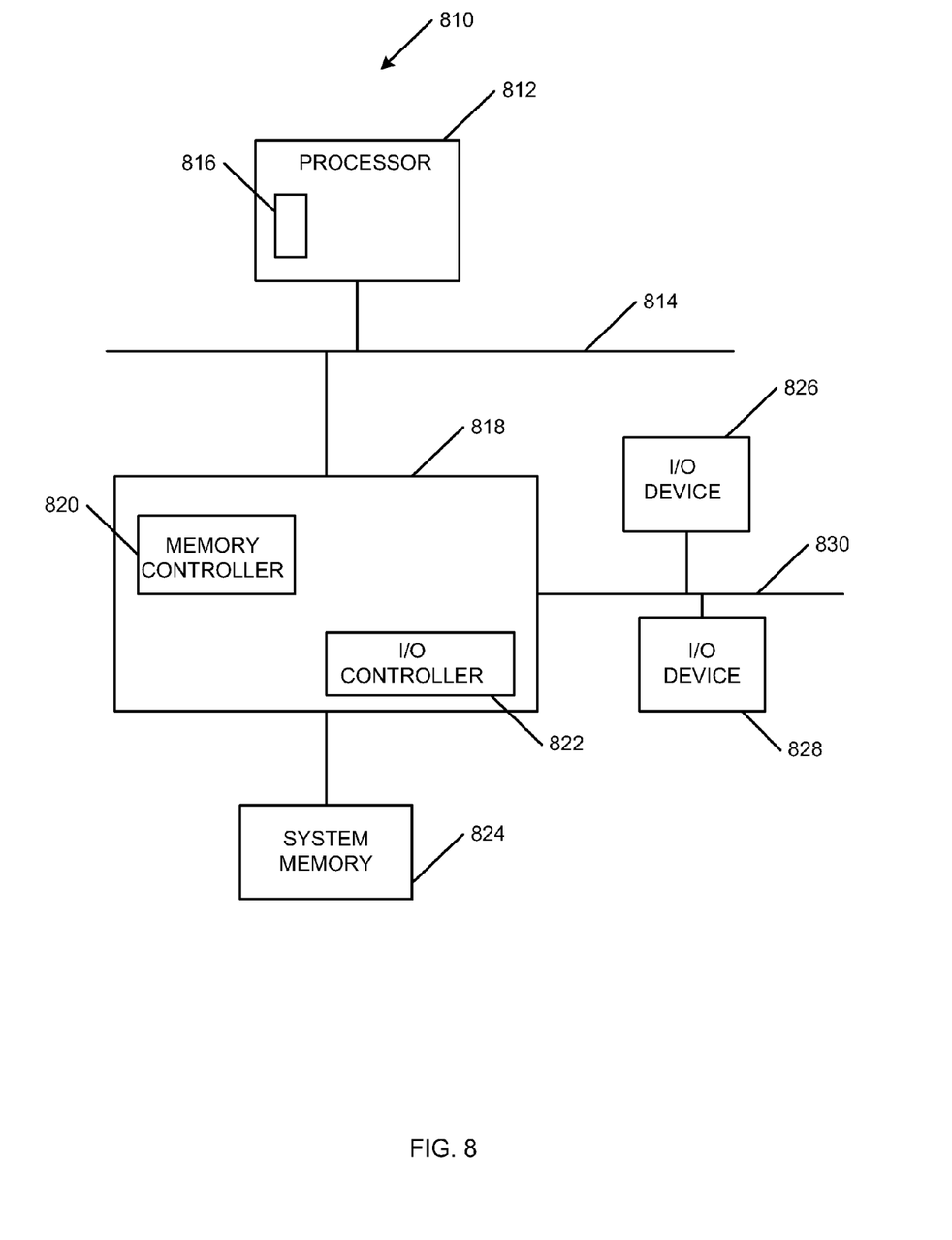
FIG. 8 is a block diagram of an example processor system that may be used to implement the apparatus and methods described herein.

FIG. 8 is a block diagram of an example processor system 810 that may be used to implement the apparatus and methods described herein. As shown in FIG. 8, the processor system 810 includes a processor 812 that is coupled to an interconnection bus or network 814. The processor 812 includes a register set or register space 816, which is depicted in FIG. 8 as being entirely on-chip, but which could alternatively be located entirely or partially off-chip and directly coupled to the processor 812 via dedicated electrical connections and/or via the interconnection network or bus 814. The processor 812 may be any suitable processor, processing unit or microprocessor such as, for example, a processor from the Intel X-Scale™ family, the Intel Pentium™ family, etc. In the example described in detail below, the processor 812 is a thirty-two bit Intel processor, which is commonly referred to as an IA-32 processor. Although not shown in FIG. 8, the system 810 may be a multi-processor system and, thus, may include one or more additional processors that are identical or similar to the processor 812 and which are coupled to the interconnection bus or network 814.

The processor 812 of FIG. 8 is coupled to a chipset 818, which includes a memory controller 820 and an input/output (I/O) controller 822. As is well known, a chipset typically provides I/O and memory management functions as well as a plurality of general purpose and/or special purpose registers, timers, etc. that are accessible or used by one or more processors coupled to the chipset. The memory controller 820 performs functions that enable the processor 812 (or processors if there are multiple processors) to access a system memory 824, which may include any desired type of volatile memory such as, for example, static random access memory (SRAM), dynamic random access memory (DRAM), etc. The I/O controller 822 performs functions that enable the processor 812 to communicate with peripheral input/output (I/O) devices 826 and 828 via an I/O bus 830. The I/O devices 826 and 828 may be any desired type of I/O device such as, for example, a keyboard, a video display or monitor, a mouse, etc. While the memory controller 820 and the I/O controller 822 are depicted in FIG. 8 as separate functional blocks within the chipset 818, the functions performed by these blocks may be integrated within a single semiconductor circuit or may be implemented using two or more separate integrated circuits.

The methods described herein may be implemented using a primarily hardware-based system (e.g., the system 700 shown in FIG. 7), a primarily processor-based or software-based system (e.g., the system 800 shown in FIG. 8), or another system employing any desired combination of hardware and software. In the case of a primarily hardware-based system such as that shown in FIG. 7, gate arrays, application specific integrated circuits, discrete semiconductor components, etc. may be used to perform the remainder generation techniques described herein. In the case of a primarily processor-based system such as that shown in FIG. 8, software or instructions stored on a machine readable medium (e.g., a random access memory, a magnetic storage medium, an optical storage medium, etc.) may be executed by a processor (e.g., the processor 812) to perform the methods described herein. Of course, any desired combination of hardware and software may be employed to accomplish the same or similar results.

In addition, while the methods depicted in FIGS. 4-6 are described as including a plurality of runtime test conditions for selecting an appropriate, efficient remainder generation or determination technique during runtime, one or more of these conditions could be eliminated from runtime operation. For example, because the value of the divisor m is known during compile time and is runtime invariant, the tests or comparisons depicted in blocks 410, 530 and 620 could be performed during compile time, thereby reducing the number of remainder determination techniques needed during runtime. In other words, fewer than all the blocks shown in FIGS. 4-6 may be used during runtime to determine remainder values as described herein. Further, the arrangement or sequence of the blocks may be changed, if desired, to accomplish the same or similar results. Although certain methods, apparatus and articles of manufacture have been described herein, the scope of coverage of this patent is not limited thereto. To the contrary, this patent covers all methods, apparatuses and articles of manufacture fairly falling within the scope of the appended claims, either literally or under the doctrine of equivalents.

What is claimed is:

1. A method comprising:
   causing a processor to multiply a dividend value by a first value to generate a second value associated with a product, wherein the first value is associated with a scaled approximate reciprocal of a divisor value, and wherein the scaled approximate reciprocal of the divisor value is determined using a compound exponent value;
   during a runtime phase, causing the processor to extract a third value from the second value, wherein the third value is generated using at least a subset bitfield of the second value;
   during the runtime phase, causing the processor to determine a remainder value based on the third value; and
   causing the processor to store the remainder value in a memory.

2. A method as defined in claim 1, wherein the dividend value and the divisor value are non-negative integers.

3. A method as defined in claim 1, wherein determining the remainder value includes calculating a scaling value by raising two to the power of the compound exponent value.

4. A method as defined in claim 3, wherein determining the remainder value includes calculating a fourth value by adding the scaling value to a compensation value associated with a rounding-up process.

5. A method as defined in claim 4, wherein determining the remainder value includes calculating the first value by dividing the fourth value by the divisor value.

6. A method as defined in claim 1, wherein the second value is stored in a range of contiguous bits.

7. A method as defined in claim 6, wherein the range of contiguous bits includes a residuary subset of contiguous bits, and wherein the residuary subset of contiguous bits includes the third value.

8. A method as defined in claim 1, wherein determining the remainder value includes setting the remainder value equal to the third value.

9. A method as defined in claim 1, wherein determining the remainder value includes setting the remainder value equal to zero if the third value equals zero.

10. A method as defined in claim 1, wherein determining the remainder value includes determining that the dividend value is exactly divisible by the divisor value if the third value equals zero.

11. A method as defined in claim 1, wherein determining the remainder value includes locating the remainder value stored within a data structure location associated with the third value.

12. A method as defined in claim 1, wherein determining the remainder value includes calculating the remainder value by adding, multiplying and bit-shifting, wherein adding results in a sum associated with the third value and one, wherein multiplying produces a product of the divisor value and the sum, and wherein bit-shifting includes right bit-shifting the product of the divisor value and the sum.

13. An apparatus comprising:
    a processor system including a memory;
    instructions stored in the memory that enable the processor system to change an operating efficiency of the processor system in connection with determining a remainder value by:
    multiplying a dividend value by a first value to generate a second value associated with a product, wherein the first value is associated with a scaled approximate reciprocal of a divisor value, and wherein the scaled approximate reciprocal of the divisor value is determined using a compound exponent value;
    extracting a third value from the second value, wherein the third value is generated using at least a subset bitfield of the second value; and
    determining the remainder value based on the third value.

14. An apparatus as defined in claim 13, wherein the dividend value and the divisor value are non-negative integers.

15. An apparatus as defined in claim 13, wherein the instructions enable the processor system to calculate a scaling value by raising two to the power of the compound exponent value.

16. An apparatus as defined in claim 15, wherein the instructions enable the processor system to calculate a fourth value by adding the scaling value to a compensation value associated with a round-up process.

17. An apparatus as defined in claim 16, wherein the instructions enable the processor system to calculate the first value by dividing the fourth value by the divisor value.

18. An apparatus as defined in claim 13, wherein the second value is stored in a range of contiguous bits.

19. An apparatus as defined in claim 18, wherein the range of contiguous bits includes a residuary subset of contiguous bits, and wherein the third value is stored in the residuary subset of contiguous bits.

20. An apparatus as defined in claim 13, wherein the remainder value is equal to the third value.

21. An apparatus as defined in claim 13, wherein the remainder value is equal to zero if the third value equals zero.

22. An apparatus as defined in claim 13, wherein the instructions enable the processor system to determine that the dividend value is exactly divisible by the divisor value if the third value equals zero.

23. An apparatus as defined in claim 13, wherein the instructions enable the processor system to locate the remainder value stored within a data structure location associated with the third value.

24. An apparatus as defined in claim 13, wherein the instructions enable the processor system to calculate the remainder value using an addition operation, a multiplication operation and a bit shift operation, wherein the addition operation results in a sum associated with the third value and one, wherein the multiplication operation produces a product of the divisor value and the sum, and wherein the bit-shift operation includes right bit-shifting the product of the divisor value and the sum.

25. A non-transitory computer readable medium having instructions stored thereon that, when executed, cause a machine to at least:
    change an operating efficiency of the machine in connection with determining a remainder value by:
    multiplying a dividend value by a first value to generate a second value associated with a product, wherein the first value is associated with a scaled approximate reciprocal of a divisor value, and wherein the scaled approximate reciprocal of the divisor value is determined using a compound exponent value;

extracting a third value from the second value, wherein the third value is generated using at least a subset bitfield of the second value; and determining the remainder value based on the third value.

26. A computer readable medium as defined in claim 25, wherein the dividend value and the divisor value are non-negative integers.

27. A computer readable medium as defined in claim 25 having instructions stored thereon that, when executed, cause the machine to calculate a scaling value by raising two to the power of the compound exponent value.

28. A computer readable medium as defined in claim 27 having instructions stored thereon that, when executed, cause the machine to calculate a fourth value by adding the scaling value to a compensation value associated with a round-up process.

29. A computer readable medium as defined in claim 27 having instructions stored thereon that, when executed, cause the machine to calculate the first value by dividing the fourth value by the divisor value.

30. A computer readable medium as defined in claim 25, wherein the second value is stored in a range of contiguous bits.

31. A computer readable medium as defined in claim 30, wherein the range of contiguous bits includes a residuary subset of contiguous bits, and wherein the third value is stored in the residuary subset of contiguous bits.

32. A computer readable medium as defined in claim 25, wherein the remainder value is equal to the third value.

33. A computer readable medium as defined in claim 25, wherein the remainder value is equal to zero if the third value equals zero.

34. A computer readable medium as defined in claim 25 having instructions stored thereon that, when executed, cause the machine to determine that the dividend value is exactly divisible by the divisor value if the third value equals zero.

35. A computer readable medium as defined in claim 25 having instructions stored thereon that, when executed, cause the machine to locate the remainder value stored within a data structure location associated with the third value.

36. A computer readable medium as defined in claim 25 having instructions stored thereon that, when executed, cause the machine to calculate the remainder value using an addition operation, a multiplication operation and a bit shift operation, wherein the addition operation results in a sum associated with the third value and one, wherein the multiplication operation produces a product of the divisor value and the sum, and wherein the bit-shift operation includes right bit-shifting the product of the divisor value and the sum.

* * * * *